US012562801B2

(12) United States Patent
Fresia et al.

(10) Patent No.: US 12,562,801 B2
(45) Date of Patent: Feb. 24, 2026

(54) BEAM ALIGNMENT IN A MULTIUSER WIRELESS CELL-FREE MASSIVE MULTIPLE-INPUT MULTIPLE-OUTPUT NETWORK

(71) Applicant: Huawei Technologies Co., Ltd., Shenzhen (CN)

(72) Inventors: Maria Fresia, Munich (DE); Stefano Buzzi, Cassino (IT); Carmen D'Andrea, Cassino (IT); Xiaofeng Wu, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 259 days.

(21) Appl. No.: 18/496,432

(22) Filed: Oct. 27, 2023

(65) Prior Publication Data

US 2024/0063886 A1     Feb. 22, 2024

Related U.S. Application Data

(63) Continuation of application No. PCT/EP2021/061365, filed on Apr. 30, 2021.

(51) Int. Cl.
| | |
|---|---|
| *H04W 4/00* | (2018.01) |
| *H04B 7/06* | (2006.01) |
| *H04L 5/00* | (2006.01) |

(52) U.S. Cl.
CPC ....... *H04B 7/06952* (2023.05); *H04L 5/0023* (2013.01)

(58) Field of Classification Search
CPC ... H04L 5/0007; H04L 5/0023; H04L 5/0025; H04L 5/006; H04B 7/06952; H04B 7/0632
See application file for complete search history.

(56) References Cited

U.S. PATENT DOCUMENTS

| | | | | |
|---|---|---|---|---|
| 10,588,029 B1 * | 3/2020 | Kay | .................... | H04W 16/28 |
| 11,800,507 B2 * | 10/2023 | Pezeshki | ................ | H04L 5/005 |

(Continued)

FOREIGN PATENT DOCUMENTS

| | | |
|---|---|---|
| CN | 109151841 A | 1/2019 |
| EP | 3247164 A1 | 11/2017 |

(Continued)

OTHER PUBLICATIONS

X. Song, S. Haghighatshoar and G. Caire, "A Scalable and Statistically Robust Beam Alignment Technique for Millimeter-Wave Systems," in IEEE Transactions on Wireless Communications, vol. 17, No. 7, pp. 4792-4805, Jul. 2018, doi: 10.1109/TWC.2018. 2831697.

(Continued)

*Primary Examiner* — Abdelnabi O Musa
(74) *Attorney, Agent, or Firm* — Slater Matsil, LLP

(57) ABSTRACT

An apparatus for wireless communication, comprising a processing unit adapted for executing a beam-alignment protocol based on a sequence of communication data-patterns, each associated with one of a sequence of alignment subcarrier-frequency slots. The protocol comprises receiving a plurality of receive information records, one from each of a plurality of wireless end devices and indicative of a plurality of signal qualities of the sequence of beam-alignment signals. Each beam alignment signal is received by the respective wireless end device in an alignment subcarrier-frequency-slot associated with the respective communication data-pattern associated with the beam-alignment signal. The protocol further comprises computing according to the plurality of receive information records a plurality of preferred communication channels, each for one of a plurality of wireless access points, and configuring the plurality of (Continued)

wireless access points according to the plurality of preferred communication channels.

18 Claims, 7 Drawing Sheets

(56)                    References Cited

U.S. PATENT DOCUMENTS

| | | | | |
|---|---|---|---|---|
| 2007/0287384 | A1* | 12/2007 | Sadri | H04B 7/0695 |
| | | | | 455/25 |
| 2016/0050094 | A1* | 2/2016 | Ryu | H04L 27/2697 |
| | | | | 370/329 |
| 2016/0099763 | A1* | 4/2016 | Chen | H04B 7/063 |
| | | | | 370/329 |
| 2016/0119902 | A1* | 4/2016 | Cheong | H04B 17/309 |
| | | | | 370/329 |
| 2016/0320182 | A1* | 11/2016 | Yamaguchi | H01L 21/0335 |
| 2018/0343605 | A1* | 11/2018 | Wu | H04W 4/46 |
| 2020/0161757 | A1* | 5/2020 | Henry | H01Q 21/20 |
| 2021/0234593 | A1* | 7/2021 | Raghavan | H04B 7/0623 |
| 2022/0346103 | A1* | 10/2022 | Dutta | H04L 1/1822 |

FOREIGN PATENT DOCUMENTS

| | | | |
|---|---|---|---|
| WO | 2020164027 | A1 | 8/2020 |
| WO | 2020237625 | A1 | 12/2020 |

OTHER PUBLICATIONS

C. Perfecto, J. Del Ser and M. Bennis, "Millimeter-Wave V2V Communications: Distributed Association and Beam Alignment," in IEEE Journal on Selected Areas in Communications, vol. 35, No. 9, pp. 2148-2162, Sep. 2017, doi: 10.1109/JSAC.2017.2719998.

J. Song, J. Choi, S. G. Larew, D. J. Love, T. A. Thomas and A. A. Ghosh, "Adaptive Millimeter Wave Beam Alignment for Dual-Polarized MIMO Systems," in IEEE Transactions on Wireless Communications, vol. 14, No. 11, pp. 6283-6296, Nov. 2015, doi: 10.1109/TWC.2015.2452263.

Haitham Hassanieh et al: "Fast Millimeter Wave Beam Alignment." Aug. 7, 2018, total 14 pages.

C. Liu, M. Li, S. V. Hanly, I. B. Collings and P. Whiting, "Millimeter Wave Beam Alignment: Large Deviations Analysis and Design Insights," in IEEE Journal on Selected Areas in Communications, vol. 35, No. 7, pp. 1619-1631, Jul. 2017, doi: 10.1109/JSAC.2017. 2699360.

F. Maschietti, D. Gesbert, P. de Kerret and H. Wymeersch, "Robust Location-Aided Beam Alignment in Millimeter Wave Massive Mimo," Globecom 2017-2017 IEEE Global Communications Conference, Singapore, Dec. 4-8, 2017, pp. 1-6, doi: 10.1109/GLOCOM. 2017.8254901.

M. Hussain and N. Michelusi, "Throughput optimal beam alignment in millimeter wave networks," 2017 Information Theory and Applications Workshop (ITA), San Diego, CA, USA, Feb. 12-17, 2017, pp. 1-6, doi: 10.1109/ITA.2017.8023460.

X. Song, S. Haghighatshoar and G. Caire, "Efficient Beam Alignment for Millimeter Wave Single-Carrier Systems With Hybrid MIMO Transceivers," in IEEE Transactions on Wireless Communications, vol. 18, No. 3, pp. 1518-1533, Mar. 2019, doi: 10.1109/ TWC.2019.2892043.

X. Li, J. Fang, H. Duan, Z. Chen and H. Li, "Fast Beam Alignment for Millimeter Wave Communications: A Sparse Encoding and Phaseless Decoding Approach," in IEEE Transactions on Signal Processing, vol. 67, No. 17, pp. 4402-4417, 1 Sep. 1, 2019, doi: 10.1109/TSP.2019.2929460.

M. Li, C. Liu, S. V. Hanly, I. B. Collings and p. Whiting, "Explore and Eliminate: Optimized Two-Stage Search for Millimeter-Wave Beam Alignment," in IEEE Transactions on Wireless Communications, vol. 18, No. 9, pp. 4379-4393, Sep. 2019, doi: 10.1109/TWC. 2019.2924368.

V. Va, T. Shimizu, G. Bansal and R. W. Heath, "Beam design for beam switching based millimeter wave vehicle-to-infrastructure communications," 2016 IEEE International Conference on Communications (ICC), Kuala Lumpur, Malaysia, May 22-27, 2016, pp. 1-6, doi: 10.1109/ICC.2016.7511414.

H. Q. Ngo, A. Ashikhmin, H. Yang, E. G. Larsson and T. L. Marzetta, "Cell-Free Massive MIMO Versus Small Cells," in IEEE Transactions on Wireless Communications, vol. 16, No. 3, pp. 1834-1850, Mar. 2017, doi: 10.1109/TWC.2017.2655515.

S. Buzzi and C. D Andrea, "Cell-Free Massive MIMO: User-Centric Approach," in IEEE Wireless Communications Letters, vol. 6, No. 6, pp. 706-709, Dec. 2017, doi: 10.1109/LWC.2017.2734893.

Giovanni Interdonato et al: "Ubiquitous cell-free Massive MIMO communications." Aug. 5, 2019, total 13 pages.

M. Alonzo, S. Buzzi, A. Zappone and C. D Elia, "Energy-Efficient Power Control in Cell-Free and User-Centric Massive MIMO at Millimeter Wave," in IEEE Transactions on Green Communications and Networking, vol. 3, No. 3, pp. 651-663, Sep. 2019, doi: 10.1109/TGCN.2019.2908228.

C. DAndrea, A. Zappone, S. Buzzi and M. Debbah, "Uplink Power Control in Cell-Free Massive MIMO via Deep Learning," 2019 IEEE 8th International Workshop on Computational Advances in Multi-Sensor Adaptive Processing (CAMSAP), Le gosier, Guadeloupe, Dec. 15-18, 2019, pp. 554-558, doi: 10.1109/CAMSAP45676.2019. 9022520.

S. Buzzi, C. D Andrea, A. Zappone and C. D Elia, "User-Centric 5G Cellular Networks: Resource Allocation and Comparison With the Cell-Free Massive MIMO Approach," in IEEE Transactions on Wireless Communications, vol. 19, No. 2, pp. 1250-1264, Feb. 2020, doi: 10.1109/TWC.2019.2952117.

* cited by examiner

200

300

Figure 4:
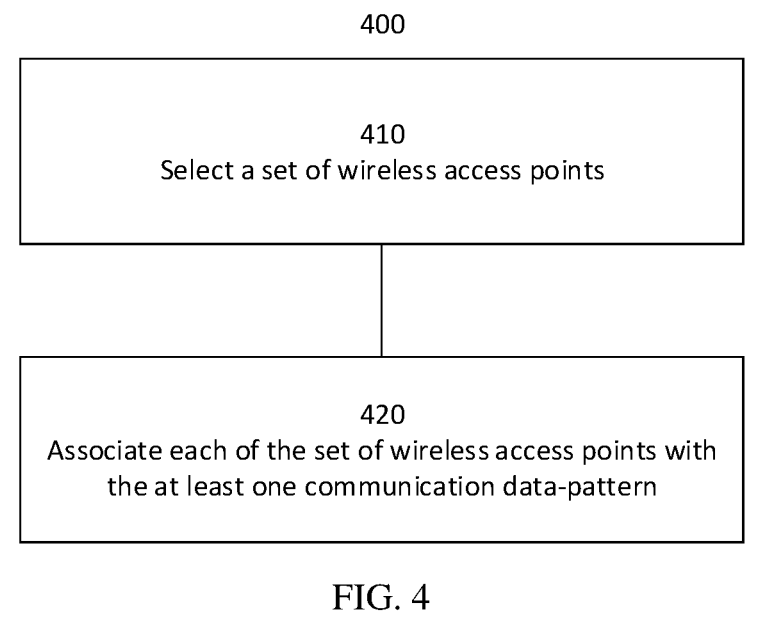

400

410
Select a set of wireless access points

420
Associate each of the set of wireless access points with
the at least one communication data-pattern

503
Compute a plurality of centroid locations

510
Cluster the plurality of wireless access points

512
Compute a new plurality of centroid locations

515
Use the new plurality of centroid locations

520
Last association iteration?

NO

YES

530
Select at most one wireless access point from each of the plurality of clusters 535
Associate with the communication data-pattern

600A

600B

700A

700B

BEAM ALIGNMENT IN A MULTIUSER WIRELESS CELL-FREE MASSIVE MULTIPLE-INPUT MULTIPLE-OUTPUT NETWORK

CROSS-REFERENCE TO RELATED APPLICATIONS

This application is a continuation of International Application No. PCT/EP2021/061365, filed on Apr. 30, 2021, the disclosure of which is hereby incorporated by reference in its entirety.

TECHNICAL FIELD

The present disclosure relates to a wireless digital communication network and, more specifically, but not exclusively, to a cell-free massive multiple-input multiple-output (MIMO) wireless digital communication network.

BACKGROUND

Henceforth, for brevity the term "wireless network" is used to mean a "wireless digital communication network" and the terms are used interchangeably.

In the field of electromagnetics, the term "beam" refers to a directional projection of electromagnetic energy radiating from a transmitting source, referred to as a transmitter. When a transmitter transmits an electromagnetic signal, henceforth a signal, the signal may be projected in more than one direction and comprise a plurality of such directional beams. A receiver may intercept some of these beams directly, when there is an open space, or direct line- of sight path, between the transmitter and the receiver. Some other of the plurality of beams may be reflected by one or more surfaces in the path of the signal, and the receiver may intercept some of the reflected beams. Some beams may be reflected more than once before intercepted by the receiver, each reflection referred to as a hop. In addition, some additional other of the plurality of beams may not be intercepted by the receiver, neither directly nor reflected.

Path loss is the reduction in power density (attenuation) of an electromagnetic wave as it propagates through a space. Myriad factors effect path loss, some factors being, but not limited to, terrain contours, environment (urban or rural, vegetation and foliage), distance between a transmitter and a receiver, reflections, and the height and location of transmitting and receiving antennas.

In free space, path loss is proportional to the square of the frequency of a carrier signal, thus implying that at an identified distance path loss using a carrier having an example frequency of 30 Giga Hertz (GHz) is wo times greater than path loss using another carrier having another example frequency of 3 GHz. In addition, when a beam of a signal is reflected, each reflection typically reduces the amount of energy that reaches the receiver.

As use of wireless networks increases, there is an increase in using higher frequency carrier signals where available bandwidth is greater. However, higher frequency carrier signals suffer greater path loss than lower frequency carrier signals, limiting a distance at which a receiver can intercept a signal from a transmitter. In addition, higher frequency carrier signals require a direct open space path between a transmitter and a receiver with few or no reflections.

The term "millimeter waves", abbreviated here within "mmWave", refers to a range of electromagnetic waves having a wavelength measured between 10-1 millimeter.

The limitations described above are significant for carrier signals having a frequency above 6 GHz, including mmWave carrier signals.

Using multiple antennas allows concentrating radiated electromagnetic energy of a transmitted signal along multiple spatial directions associated with an existing line of sight path with at most one reflected hop between the transmitter and the receiver. In the field of wireless communications, the term "beam alignment" refers to aligning transmission of a beam (signal) along directions of a strongest path among multiple paths in multiple spatial directions, so as to increase the amount of electromagnetic energy of the signal intercepted by the receiver.

As used here within, the term "wireless end device" means a wireless communication device, capable of connecting to a wireless digital communication network for the purpose of sending and, additionally or alternatively, receiving digital data via the wireless digital communication network. Some examples of a wireless end device are a cellular phone, a tablet, a personal digital assistant device, a smart television, a personal computer and a mobile computer.

In some wireless networks the network is divided into a plurality of identified areas, known as cells. A base station is a wireless communication device that provides network communication coverage to a cell. The term massive MIMO refers to the use of a large amount of antennas at a base station. Such availability of many antennas permits creating almost orthogonal channels among the base station and a plurality of wireless end devices, including when using a common band of frequencies. A time-frequency slot is a time slot on a common carrier signal frequency (channel). Massive MIMO thus enables simultaneous transmission from the base station to several wireless end devices using the same time-frequency slot with a minimum amount of interference.

When a wireless end device is located between two or more cells, interference between a plurality of signals of a plurality of base stations of the two or more cells reduces the signal-to-noise ratio experienced by the wireless end device and there is a need to employ methods to decrease such spectral interference.

In the field of wireless communication, an access point is a networking hardware device that allows other wireless devices to connect to a communication network. A cell-free massive MIMO network is a massive MIMO network that uses, instead of a base station per cell, a plurality of distributed access points that simultaneously and jointly serve a plurality of wireless end devices, using a common time-frequency slot. Each of the plurality of wireless access points may have fewer antennas than a base station. Typically, a wireless access point is less complex than a base station as each of the plurality of wireless access points serves a smaller amount of wireless end devices than a base station in a cell-based massive MIMO.

SUMMARY

Some embodiments of the present disclosure describe an apparatus and method for a beam alignment protocol for a plurality of wireless access points and a plurality of wireless end devices, based on a sequence of communication data-patterns each associated with one of a sequence of alignment subcarrier-frequency-slots. A communication data-pattern is a sequence of subcarrier-frequencies and beamforming directions along which to transmit constant power.

According to a first aspect of the disclosure, an apparatus for wireless communication, comprises a processing unit adapted for: receiving a plurality of receive information records, one from each of a plurality of wireless end devices and indicative of a plurality of signal qualities of a sequence of beam-alignment signals each associated with one of a sequence of communication data-patterns, each beam alignment signal received by the respective wireless end device in an alignment subcarrier-frequency-slot associated with the respective communication data-pattern associated with the beam-alignment signal; computing according to the plurality of receive information records a plurality of preferred communication channels, each for one of a plurality of wireless access points; and configuring the plurality of wireless access points according to the plurality of preferred communication channels. Using a sequence of beam-alignment signals each associated with a respective communication data-pattern and received in an alignment subcarrier-frequency slot associated with the respective communication data pattern allows associating each of the sequence of beam-alignment signals with one of a plurality of access points, thus allowing simultaneous beam-alignment for the plurality of access points and a plurality of end devices, reducing an amount of time required to configure a wireless network.

According to a second aspect of the disclosure, a method for wireless communication comprises: receiving a plurality of receive information records, one from each of a plurality of wireless end devices and indicative of a plurality of signal qualities of a sequence of beam-alignment signals each associated with one of a sequence of communication data-patterns, each beam alignment signal received by the respective wireless end device in an alignment subcarrier-frequency-slot associated with the respective communication data-pattern associated with the beam-alignment signal; computing according to the plurality of receive information records a plurality of preferred communication channels, each for one of a plurality of wireless access points; and configuring the plurality of wireless access points according to the plurality of preferred communication channels.

According to a third aspect of the disclosure, a software program product for wireless communication comprises: a non-transitory computer readable storage medium; first program instructions for receiving a plurality of receive information records, one from each of a plurality of wireless end devices and indicative of a plurality of signal qualities of a sequence of beam-alignment signals each associated with one of a sequence of communication data-patterns, each beam alignment signal received by the respective wireless end device in an alignment subcarrier-frequency-slot associated with the respective communication data-pattern associated with the beam-alignment signal; second program instructions for computing according to the plurality of receive information records a plurality of preferred communication channels, each for one of a plurality of wireless access points; and third program instructions for configuring the plurality of wireless access points according to the plurality of preferred communication channels. The first, second, and third program instructions are executed by at least one computerized processor from the non-transitory computer readable storage medium.

According to a fourth aspect of the disclosure, a wireless access-point device comprises a processing unit adapted for: performing, in response to a protocol initialization instruction received from a manager, an access-point part of a beam-alignment protocol based on a sequence of communication data-patterns each associated with one of a sequence of alignment subcarrier-frequency-slots; receiving from the manager a plurality of channel configurations, each associated with one of a plurality of wireless end devices; and sending to at least one of the plurality of wireless end devices at least one signal according to the respective channel configuration associated therewith.

According to a fifth aspect of the disclosure, a method for a wireless access-point device comprises: performing, in response to a protocol initialization instruction received from a manager, an access-point part of a beam-alignment protocol based on a sequence of communication data-patterns each associated with one of a sequence of alignment subcarrier-frequency-slots; receiving from the manager a plurality of channel configurations, each associated with one of a plurality of wireless end devices; and sending to at least one of the plurality of wireless end devices at least one signal according to the respective channel configuration associated therewith.

According to a sixth aspect of the disclosure, a software program product for a wireless access-point device comprises: a non-transitory computer readable storage medium; first program instructions for performing, in response to a protocol initialization instruction received from a manager, an access-point part of a beam-alignment protocol based on a sequence of communication data-patterns each associated with one of a sequence of alignment subcarrier-frequency-slots; second program instructions for receiving from the manager a plurality of channel configurations, each associated with one of a plurality of wireless end devices; and third program instructions for sending to at least one of the plurality of wireless end devices at least one signal according to the respective channel configuration associated therewith; wherein the first, second, and third program instructions are executed by at least one computerized processor from the non-transitory computer readable storage medium.

According to a seventh aspect of the disclosure, a wireless communication device comprises a processing unit adapted for: performing, in response to a protocol initialization instruction received from a manager, a wireless-end-device part of a beam-alignment protocol based on a sequence of communication data-patterns each associated with one of a sequence of alignment subcarrier-frequency-slots; receiving from the manager at least one channel configuration for communicating with at least one wireless access point; and receiving from the at least one wireless access point at least one signal sent according to the at least one channel configuration.

According to an eighth aspect of the disclosure, a method for a wireless communication device comprises: performing, in response to a protocol initialization instruction received from a manager, a wireless-end-device part of a beam-alignment protocol based on a sequence of communication data-patterns each associated with one of a sequence of alignment subcarrier-frequency-slots; receiving from the manager at least one channel configuration for communicating with at least one wireless access point; and receiving from the at least one wireless access point at least one signal sent according to the at least one channel configuration.

According to a ninth aspect of the disclosure, a software program product for a wireless communication device comprises: a non-transitory computer readable storage medium; first program instructions for performing, in response to a protocol initialization instruction received from a manager, a wireless-end-device part of a beam-alignment protocol based on a sequence of communication data-patterns each associated with one of a sequence of alignment subcarrier-frequency-slots; second program instructions for receiving from the manager at least one channel configuration for communicating with at least one wireless access point; and third program instructions for receiving from the at least one wireless access point at least one signal sent according to the at least one channel configuration. The first, second, and third program instructions are executed by at least one computerized processor from the non-transitory computer readable storage medium.

In an implementation form of the first and second aspects, the processing unit is further adapted for: configuring each of the plurality of wireless access point to transmit one of the sequence of beam-alignment signals in the alignment sub-carrier-frequency-slot associated with the respective communication data-pattern associated with the beam-alignment signal; and sending a protocol initialization instruction to the plurality of wireless access points and the plurality of wireless end devices. Configuring each of the plurality of wireless access points to transmit one of the sequence of beam-alignment signals in the alignment subcarrier-frequency-slot associated with the respective communication data-pattern associated with the beam-alignment signal facilitates distinguishing in an end device between beam-alignment signals transmitted by different wireless access points, reducing complexity of a beam-alignment protocol and reducing an amount of time needed to configure the wireless network. Optionally, the beam-alignment signal is received by the respective wireless end device using a plurality of data channel frequencies, receiving the plurality of receive information records comprises using a wireless control channel frequency, and sending the protocol initialization instruction to the plurality of wireless devices comprises using the wireless control channel frequency. Optionally, at least one of the plurality of data channel frequencies is a millimeter wave frequency. Using a millimeter wave frequency for a data channel increases utilization of the wireless network. Optionally, the wireless control channel frequency is not a millimeter wave frequency. Using a non-millimeter wave frequency for the wireless control channel facilitates communication between a manager and the plurality of end devices without performing beam alignment, reducing complexity of network configuration. Optionally, configuring at least some of the plurality of wireless access points to transmit one of the sequence of beam-alignment signals comprises using another wireless control channel frequency. Optionally, the other wireless control channel frequency is not a millimeter wave frequency. Using a non-millimeter wave frequency for the other wireless control channel facilitates communication between a manager and the plurality of access points without performing beam alignment, reducing complexity of network configuration. Optionally, at least some other of the plurality of wireless access points are connected to the processing unit via a wired digital communication network, and configuring the at least some other of the plurality of wireless access points is via the wired digital communication network.

In another implementation form of the first and second aspects, each of the sequence of communication data-patterns comprises a sequence of data channel frequencies, each associated with a transmission direction. Using a communication data-pattern having a sequence of data-channels facilitates transmitting a signal having a variant frequency over time, increasing an amount of frequencies and directions for which receive information may be collected simultaneously, reducing complexity of a beam-alignment protocol and reducing an amount of time required to perform beam alignment compared to sending each beam-alignment signal using one frequency.

In a further implementation form of the first and second aspects, the processing unit is further adapted for: computing an association between each of the plurality of wireless access points and one of the sequence of communication data-patterns; and configuring each of the plurality of wireless access points to transmit a beam-alignment signal according to the respective communication data-pattern associated therewith in the alignment subcarrier-frequency-slot associated with the respective communication data-pattern. Optionally, the sequence of communication data-patterns are selected from an identified plurality of communication data-patterns. Optionally, associating each of the plurality of wireless access points with one of the sequence of communication data-patterns minimizes an amount of signal interference between a plurality of wireless signals transmitted simultaneously by the plurality of wireless access points, according to at least one signal quality metric. Minimizing an amount of signal interference between a plurality of wireless signals transmitted simultaneously facilitates performing beam-alignment simultaneously for the plurality of wireless access points and the plurality of wireless end devices, reducing an amount of time required to configure the wireless network and thus increasing utilization of the wireless network. Optionally, associating each of the plurality of wireless access points with one of the sequence of communication data-patterns comprises for at least one of the identified plurality of communication data-patterns: selecting from the plurality of wireless access point a set of wireless access points such that for each two of the set of wireless access points a distance between the two wireless access points is greater than a minimum distance threshold; and associating each of the set of wireless access points with the at least one of the identified plurality of communication data-patterns. Associating a communication data-pattern with a set of wireless access points where for each two of the set of wireless access points a distance between the two wireless access points is greater than a minimum distance threshold reduces an amount of interference between a plurality of signals sent simultaneously by the set of wireless access points, increasing utilization of the wireless network. Optionally, the plurality of wireless access points is located in an identified space. Optionally, associating each of the plurality of wireless access points with one of the sequence of communication data-patterns comprises: computing a plurality of centroid locations in the identified space; in each of a plurality of association iterations: clustering the plurality of wireless access points according to a respective distance from one of the plurality of centroid locations to produce a plurality of clusters, each having a plurality of cluster access points; computing a new plurality of centroid locations by computing for each of the plurality of clusters a new centroid location having a common mean distance from each of the cluster's respective plurality of cluster access points; and using the new plurality of centroid locations as the plurality of centroid locations in a consecutive association iteration of the plurality of association iterations; and for each of the sequence of communication data-patterns: selecting from each of the plurality of clusters of a last association iteration of the plurality of association iterations at most one wireless access point from the cluster's respective plurality of cluster access points; and associating the at most one wireless access point with the communication data-pattern. Clustering the plurality of wireless access points according to a distance from one of a plurality of centroid location in an identified space facilitates identifying one or more access points that may interfere with each other, increasing accuracy of an outcome of the beam-alignment protocol and thus increasing utilization of the wireless network.

In a further implementation form of the first and second aspects, each of the plurality of receive information records comprises: a device identification value of the respective wireless end device from which the processing unit received the receive information record; and for each of the sequence of communication data patterns a plurality of signal quality values indicative of a best part of a beam-alignment signal received by the respective wireless end device in the respective alignment subcarrier-frequency-slot associated with the communication data-pattern. Optionally, at least one of the plurality of signal quality values is selected from a group of signal quality values consisting of: an angle of arrival, an estimated angle of departure, and a signal strength indicator. Using a signal quality value indicative of a best part of a beam-alignment signal increases accuracy of an outcome of the beam-alignment protocol and thus increases utilization of the wireless network.

In a further implementation form of the first and second aspects, the plurality of wireless access-points are connected to the plurality of wireless end devices using an identified wireless protocol having a plurality of beacon slots, and the alignment subcarrier-frequency-slot is one of a sequence of beacon slots selected from the plurality of beacon slots. Using a sequence of beacon slots allows performing beam-alignment without interrupting data communication in the wireless network, increasing utilization of the wireless network.

In a further implementation form of the first and second aspects, at least one of the plurality of wireless access points comprises an access point processing unit adapted for: performing, in response to a protocol initialization instruction received from the processing unit, an access-point part of a beam-alignment protocol based on a sequence of communication data-patterns each associated with one of a sequence of alignment subcarrier-frequency-slots; receiving from the processing unit at least some of the plurality of preferred communication channels, each associated with one of at least some of the plurality of wireless end devices; and sending to one or more of the at least some wireless end devices at least one signal according to the respective preferred channel configuration associated therewith. Optionally, performing the access-point part of the beam-alignment protocol comprises: receiving from the processing unit a subcarrier-frequency-slot indicator and a communication data-pattern for performing beam-alignment; and sending in an alignment subcarrier-frequency-slot, selected from the sequence of alignment subcarrier-frequency-slots according to the subcarrier-frequency-slot indicator, a beam-alignment signal according to the communication data-pattern, in response to the protocol initialization instruction received from the processing unit. Optionally, each of the sequence of communication data-patterns comprises a sequence of data channel frequencies, each associated with a transmission direction. Optionally, sending the beam-alignment signal according the communication data-pattern comprises, in each of a plurality of data-pattern iterations, transmitting part of the beam-alignment signal using one of the sequence of data channel frequencies in the respective transmission direction associated therewith, and the plurality of data-pattern iterations are executed consecutively in order of the sequence of data channel frequencies. Optionally, the beam-alignment signal comprises a plurality of symbols modulated using orthogonal frequency-division multiplexing (OFDM) symbols.

In a further implementation form of the first and second aspects, at least one of the plurality of wireless end devices comprises a device processing unit adapted for: performing, in response to a protocol initialization instruction received from the processing unit, a wireless-end-device part of a beam-alignment protocol based on a sequence of communication data-patterns each associated with one of a sequence of alignment subcarrier-frequency-slots; receiving from the processing unit at least one channel configuration for communicating with at least one wireless access point of the plurality of wireless access points; and receiving from the at least one wireless access point at least one signal sent according to the at least one channel configuration. Optionally, performing the wireless-end-device part of the beam-alignment protocol comprises: receiving from at least some of the plurality of wireless access points a plurality of beam-alignment signals, each in one of the sequence of alignment subcarrier-frequency-slots, the alignment subcarrier-frequency-slot associated with one of the sequence of communication data-patterns; computing a plurality of receive information records, each for one of the plurality of beam-alignment signals, indicative of a quality of a best part of the respective beam-alignment signal and associated with the respective communication data-pattern associated with the respective alignment subcarrier-frequency-slot in which the beam-alignment signal was received; and sending the plurality of receive information records to the processing unit.

In a further implementation form of the first and second aspects, computing the plurality of preferred communication channels such that the plurality of preferred communication channels minimizes an amount of interference between the plurality of preferred communication channels according to at least one communication metric. Minimizing an amount of interference between the plurality of preferred communication channels increases utilization of the wireless network.

In an implementation form of the fourth and fifth aspect, performing the access-point part of the beam-alignment protocol comprises: receiving from the manager a subcarrier-frequency-slot indicator and a communication data-pattern for performing beam-alignment; and sending in an alignment subcarrier-frequency-slot, selected from the sequence of alignment subcarrier-frequency-slots according to the subcarrier-frequency-slot indicator, a beam-alignment signal according to the communication data-pattern, in response to the protocol initialization instruction received from the manager. Optionally, each of the sequence of communication data-patterns comprises a sequence of data channel frequencies, each associated with a transmission direction. Optionally, sending the beam-alignment signal according the communication data-pattern comprises, in each of a plurality of data-pattern iterations, transmitting part of the beam-alignment signal using one of the sequence of data channel frequencies in the transmission direction, and the plurality of data-pattern iterations are executed consecutively in order of the sequence of data channel frequencies. Optionally, the beam-alignment signal comprises a plurality of symbols modulated using orthogonal frequency-division multiplexing (OFDM) symbols.

In an implementation form of the seventh and eighth aspect, performing the wireless-end-device part of the beam-alignment protocol comprises: receiving from a plurality of wireless access points a plurality of beam-alignment signals, each in one of the sequence of alignment subcarrier-frequency-slots, the alignment subcarrier-frequency-slot associated with one of a sequence of communication data-patterns; computing a plurality of receive information records, each for one of the plurality of beam-alignment signals, indicative of a quality of a best part of the respective beam-alignment signal and associated with the respective communication data-pattern associated with the respective alignment subcarrier-frequency-slot in which the beam-alignment signal was received; and sending the plurality of receive information records to the manager.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

FIG. 4 is a flowchart schematically representing an optional flow of operations for associating an access point with a communication data-pattern, according to some embodiments;

DETAILED DESCRIPTION OF ILLUSTRATIVE EMBODIMENTS

Figure 1:
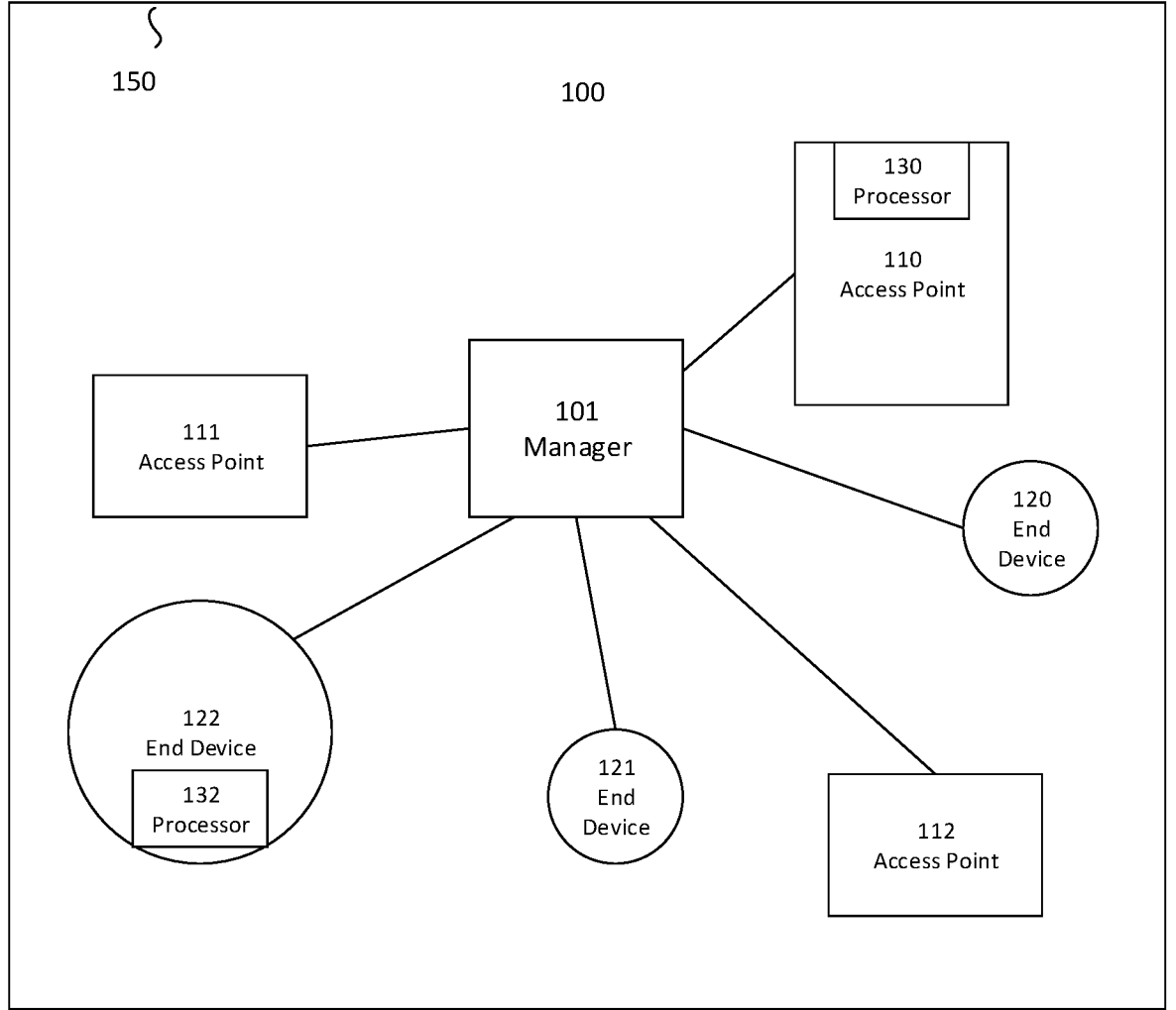
FIG. 1 is a schematic block diagram of an exemplary apparatus, according to some embodiments.

When a cell-free massive MIMO network uses high frequency carrier signals and particularly, but not limited to, mmWave carrier signals, there is a need to perform beam alignment for each of the plurality of wireless end devices.

There exist solutions for performing beam alignment for one wireless end device and a base station having a plurality of antennas. Such existing solutions assume there is no interference in the communication of the base station with the one wireless end device by communication between the base station and other wireless end devices. In addition, in some existing solutions the base station and wireless end device alternately have transmission and reception tasks, increasing an amount of time for performing beam alignment.

However, in a cell-free massive MIMO network there are a plurality of wireless end devices, and each wireless end device is typically served by one or more dedicated wireless access points. When a cell-free massive MIMO uses high frequency carrier signals and particularly, but not limited to, mmWave carrier signals, there is a need to perform beam alignment for each of the plurality of wireless end devices. There is a need to assign each of the plurality of wireless end devices one or more of the plurality of wireless access points to be served thereby, and to perform beam alignment for the plurality of wireless end devices simultaneously served by the plurality of wireless access points to reduce an amount of interference between the plurality of wireless access points when serving the plurality of wireless end devices.

For brevity, henceforth the term "access point" is used to mean "wireless access point", and the terms are used interchangeably. Similarly, the term "end device" is henceforth used to mean "wireless end device" and the terms are used interchangeably.

Each of the plurality of wireless end devices has an end device array of antennas. As a wireless end device may be handled by a person, for example hand-held by a person, an orientation of the array of antennas of the end device is not usually known and may change over time. In addition, while orientation of an array of antennas of an access point may be originally known, an access point's array of antennas may shift due to environment conditions, for example wind or collision of another object with the access point's array of antennas.

In addition, in some existing networks having multiple transmission-reception points (multi-TRP networks) network topology is fixed, limiting an ability of a network to adapt when a wireless end device moves. In addition, a transmission point is typically a relay with limited computational capabilities. Some existing beam alignment procedures in multi-TRP networks employ exhaustive search methods having a high computation complexity, sometimes beyond capabilities of a relay with limited computational capabilities.

To assign each of the plurality of end devices one or more of the plurality of access points and to perform beam alignment for each of the plurality of end devices, there is a need to know for each pair of access point and end device a strength of a signal from the access point intercepted by the end device. In addition, there is a need to know for each pair of access point and end device along which directions of transmission from the access point and directions of reception by the end device beams should be formed to enable communication between the access point and the end point, that is which directions result in a received signal sufficiently strong for the end device to intercept it (i.e. there is a need to perform beam alignment for each pair). Furthermore, there is a need to perform beam alignment without requiring an exhaustive search and without prior knowledge of orientation of arrays of antennas of the plurality of wireless end devices and additionally or alternatively of the plurality of wireless access points. In addition, to simultaneously perform beam alignment for a plurality of wireless access points and a plurality of end devices, there is a need to allow a wireless end device to discriminate between the plurality of access points without an identification value identifying an access point and without knowledge of the plurality of access points' respective positions relative to the end device and their respective transmit power.

To do so, some embodiments described here within propose a beam-alignment protocol based on a sequence of communication data-patterns, where each of the sequence of communication data-patterns is associated with one of a sequence of alignment subcarrier-frequency-slots. As used here within, a "subcarrier-frequency" is a frequency derived from a carrier frequency and modulated to send other information not sent on the carrier frequency. A "subcarrier-frequency-slot" is a time slot when using a subcarrier-frequency. An alignment subcarrier-frequency-slot is a subcarrier-frequency-slot used when performing beam alignment. Optionally, a data-pattern comprises a sequence of data channel frequencies, each data channel frequency associated with a transmission direction. Thus, in some embodiments each communication data-pattern comprises a sequence of subcarrier-frequencies, each associated with a transmission direction. Optionally, the sequence is of subcarrier-frequencies is a sequence in time, such that a signal transmitted according to the data-pattern has a variant frequency over time.

According to some embodiments, a manager of a wireless network configures each of a plurality of access points of the wireless network to send a beam-alignment signal in a subcarrier-frequency-slot of a sequence of alignment subcarrier-frequency-slots, where the beam-alignment signal is sent according to a communication data-pattern associated with the subcarrier-frequency-slot, and the subcarrier-frequency-slot is selected according to a slot indicator assigned by the manager to the access point. Thus, in such embodiments each of the plurality of access points is associated with one of subcarrier-frequency-slots.

In such embodiments, the manager configures each of a plurality of end devices of the wireless network to receive a plurality of beam-alignment signals from the plurality of access points, where each beam-alignment signal is received by the plurality of end devices in the respective alignment subcarrier-frequency-slot associated with the respective communication data-pattern of the beam-alignment signal. As each of the plurality of access points is associated with one of the sequence of alignment subcarrier-frequency-slots, a signal intercepted by an end device during an alignment subcarrier-frequency-slot is associated with the respective one or more access points associated with the alignment subcarrier-frequency-slot. Optionally, the manager associates each of the plurality of access points with one of the sequence of alignment subcarrier-frequency-slots such that a likelihood of an end device intercepting more than one signal sent by more than one access point is reduced, and thus for an end device each alignment subcarrier-frequency-slot is associated with one access point. This association allows an end device to discriminate between the plurality of access points according to the sequence of alignment subcarrier-frequency-slots. In addition, the manager optionally associates each of the plurality of access points with one of the sequence of alignment subcarrier-frequency-slots to minimize an amount of signal interference between a plurality of wireless signals transmitted simultaneously by the plurality of access points according to one or more signal quality metrics. A possible example of a signal quality metric is a mean average of signal interference between all pairs of access point and end device. Optionally, the manager associates each of the plurality of access points such that a distance between two access points associated with a common data-pattern is greater than a threshold distance. Optionally, the threshold distance is greater than a minimum distance determined such that interference between the two access points is reduced. Optionally, the sequence of communication data-patterns is selected from an identified plurality of communication data-patterns. The minimum distance may depend on an amount of data-patterns in the sequence of communication data-patterns relative to an amount of data-patterns in the identified plurality of communication data-patterns. When more data-patterns of the identified plurality of communication data-patterns are used in each sequence of communication data-patterns the minimum distance between the two access points is optionally increased, when possible, to reduce a likelihood of interference between the two access points.

Optionally, each of the plurality of end devices sends the manager a plurality of receive information records, one for each of the plurality of beam-alignment signals. Optionally, each receive information record is indicative of a quality of a best part of the respective beam-alignment signal associated with the receive information record. Some examples of a signal quality value indicative of a quality of part of a signal include, but are not limited to: an angle of arrival, an estimated angle of departure, and a signal strength indicator. Optionally, each receive information record is associated with the respective alignment subcarrier-frequency-slot in which the respective beam-alignment signal was received. Thus, each receive information record is optionally associated with the respective communication data-pattern associated with the respective alignment subcarrier-frequency-slot in which the respective beam-alignment signal was received. Furthermore, each receive information record is thus optionally associated with the respective access point that sent the respective beam-alignment signal during the respective alignment subcarrier-frequency-slot. Optionally, each end device sends the manager one receive information record and indicative of a plurality of signal qualities of a sequence of beam-alignment signals, each associated with one of the sequence of communication data-patterns. This association preserves an association between an indication of a signal quality of a best part of a beam-alignment signal and one of the plurality of access points.

Optionally, the manager receives the plurality of receive information records. Optionally, a receive information record indicative of a plurality of signal qualities comprises for each of the plurality of beam-alignment signals a direction of the strongest path of the respective communication data-pattern used to transmit the beam-alignment signals and a strength thereof. Optionally, the computation in the manager would merely comprise the association of each wireless end device with one or more of the plurality of access points. As each receive information record preserves an association between an indication of a signal quality of a best part of a beam-alignment signal and one of the plurality of access points, the manager receives in one sequence of subcarrier-frequency slots information from each of the plurality of end devices regarding signal quality of associated with each of the plurality of access points, without requiring multiple iterations of communication between the manager and each of the plurality of end devices, reducing an amount of time required to configure the wireless network.

Optionally, the manager computes a plurality of preferred communication channels according to the plurality of receive information records, each preferred communication channel for one of the plurality of access points for communication with one of the plurality of end devices. Optionally, a preferred communication channel comprises one or more subcarrier frequencies and one or more transmission directions. Optionally, the plurality of preferred communication channels minimizes an amount of interference between the plurality of communication channels according to at least one communication metric, for example by maximizing a receive signal strength of each of the plurality of communication channels. Computing the plurality of preferred communication channels to minimize an amount of interference between the plurality of communication channels increases utilization of the wireless network.

For at least one of the plurality of access points, the manager optionally configures the access point to communicate with at least one of the plurality of end devices using one of the preferred communication channels. Similarly, the manager optionally configures the at least one end device to communicate with the access point using the preferred communication channel.

Optionally, an access point sends a beam-alignment using a plurality of signals. Optionally, a wireless end device receives the beam-alignment signal using the plurality of data channel frequencies. Optionally, for example when a data-pattern comprises a sequence of data channel frequencies, each associated with a transmission direction, sending the beam-alignment signal in the subcarrier-frequency-slot comprises a plurality of data-pattern iterations executed consecutively in order of the sequence of data channel frequencies. Optionally, in each of the plurality of data-pattern iterations the access point transmits part of the beam-alignment signal using one of the sequence of data-channel frequencies in the respective transmission direction associated therewith, according to the order of the sequence of data channel frequencies. Using a data-pattern comprising a sequence of data channel frequencies, each associated with a transmission direction, allows using in one subcarrier-frequency-slot a plurality of data channel frequencies and a plurality of transmission directions, reducing an amount of time required to collect information required to perform beam alignment and thus reducing an amount of time required to configure the wireless network.

Optionally, one or more of the plurality of data channel frequencies is a mmWave frequency. Using a mmWave frequency when sending a beam-alignment signal allows one or more of the plurality of receive information records to be indicative of a signal quality when using the mmWave frequency and thus facilitates performing beam alignment for the mmWave frequency, increasing accuracy of a preferred communication channel computed using the plurality of receive information records and increasing utilization of the wireless network by using a communication channel having the mmWave frequency.

Optionally, the manager communicates with the plurality of end devices using a wireless control channel frequency, for example the manager may receive the plurality of receive information records using the wireless control channel frequency and additionally, or alternatively, initiate the protocol comprising sending a protocol initialization instruction to the plurality of end devices using the wireless control channel frequency. Optionally, the wireless control channel frequency is not a mmWave frequency. Using a wireless control channel frequency that is not a mmWave frequency increases likelihood of the manager communicating with the plurality of end devices without performing beam alignment for the wireless control channel frequency for each of the plurality of end devices.

Optionally, the manager communicates with at least some of the plurality of access points using another wireless control channel frequency, for example the manager may configure at least some of the plurality of access points using the other wireless control channel frequency and additionally, or alternatively, initiate the protocol comprising sending the protocol initialization instruction to the plurality of access points using the other wireless control channel frequency. Optionally, the other wireless control channel frequency is not a mmWave frequency. Using another wireless control channel frequency that is not a mmWave frequency increases likelihood of the manager communicating with at least some of the plurality of access points without performing beam alignment for the other wireless control channel frequency for each of the plurality of access points. Optionally, the manager is connected to at least some other of the plurality of access points via a wired digital communication network, for example an Ethernet network. When the manager is connected to the at least some other of the plurality of access points via the wired digital communication network, the manager optionally communicates with the at least some other of the plurality of access points via the wired digital communication network. Optionally, the manager is implemented in one of the plurality of access points.

Optionally, to configure the plurality of access points to transmit one of the sequence of beam-alignment signals, the manager computes an association between each of the plurality of access points and one of the sequence of communication data patterns. Optionally, computing the association comprises computing a plurality of centroid locations in an identified space wherein the plurality of access points is located. Optionally, in each of a plurality of association iterations, the manager clusters the plurality of access points in a plurality of clusters according to a respective distance from one of the plurality of centroid locations such that each of the plurality of clusters has a plurality of cluster access points of the plurality of access points. Optionally, in each of the plurality of association iterations the manager computes for each of the plurality of clusters a new centroid location having a common mean distance from each of the cluster's respective plurality of cluster access points. Optionally, the manager uses a plurality of new centroid locations, each computed for one of the plurality of clusters, as the plurality of centroid locations for a consecutive association iteration of the plurality of association iterations.

Optionally, the manager uses a last plurality of clusters computed in a last iteration of the plurality of association iterations to compute the association between the plurality of access points and the sequence of communication data patters. Optionally, for each of the sequence of communication data-patterns, the manager selects from each of the last plurality of clusters at most one access point from the cluster's respective plurality of cluster access points and associates the at most one access point with the sequence of communication data-patterns. Optionally, in each cluster of the last plurality of clusters each of the sequence of communication data-patterns is associated with one of the sequence of subcarrier-frequency-slots. Optionally, each of the last plurality of clusters has a unique sequence of communication data-patterns, selected from the identified plurality of communication data-patterns. Associating a unique sequence of communication data-patterns with each of the last plurality of clusters allows reducing a likelihood of two access points using a common data pattern during a common subcarrier-frequency-slot, reducing a likelihood of interference between the two access points and thus increasing accuracy of one or more receive information records computed by one or more of the plurality of end devices, increasing accuracy of the plurality of preferred communication channels and increasing network utilization of the wireless network.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary apparatus wo for wireless communication, according to some embodiments. In such embodiments, apparatus wo comprises a manager 101, where the manager 101 is a processing unit. A processing unit may be any kind of programmable or non-programmable circuitry that is configured to carry out the operations described above and below. The processing unit may comprise hardware as well as software. For example, the processing unit may comprise one or more processors and a transitory or non-transitory memory that carries a program which causes the processing unit to perform the respective operations when the program is executed by the one or more processors.

Optionally, manager 101 manages a wireless network in space 150. Optionally, manager 101 is connected to a plurality of wireless access points, for example including access point 110, access point in and access point 112. Optionally, at least some of the plurality of wireless access points are located in space 150. Optionally, each if the plurality of access points comprises an access-point processing unit, for example for performing an access-point part of a beam-alignment protocol. For example, access point no may comprise access processing unit 130. Optionally, manager 101 is implemented in one of the plurality of access points. For example, when manager 101 is implemented in access point 110, processing unit 130 is optionally manager 101.

Optionally, manager 101 is connected to a plurality of wireless end devices, for example including end device 120, end device 121 and end device 122. Optionally, at least some of the plurality of end devices are located in space 150. Optionally, each of the plurality of end devices comprises a device processing unit, for example for performing an end-device part of the beam alignment protocol. For example, end device 122 may comprise device processing unit 132.

Optionally, manager 101 is connected to one or more of the plurality of end devices via a wireless control channel having a wireless control channel frequency. Optionally, the wireless control channel frequency is not a mmWave frequency. Optionally, the wireless control channel frequency is less than 6 GHz.

Optionally, manager 101 is connected to one or more of the plurality of access points via another wireless control channel having another wireless control channel frequency. Optionally, the other wireless control channel frequency is not a mmWave frequency. Optionally, the other wireless control channel frequency is less than 6 GHz. Optionally, manager 101 is connected to one or more other of the plurality of access points via a wired digital communication network. Some examples of a wired digital communication network are an Ethernet network, and a Universal Serial Bus communication connection.

Optionally, the plurality of access points is connected to the plurality of end devices using a wireless network protocol. Optionally, the wireless network protocol has a plurality of beacon slots.

Figure 2:
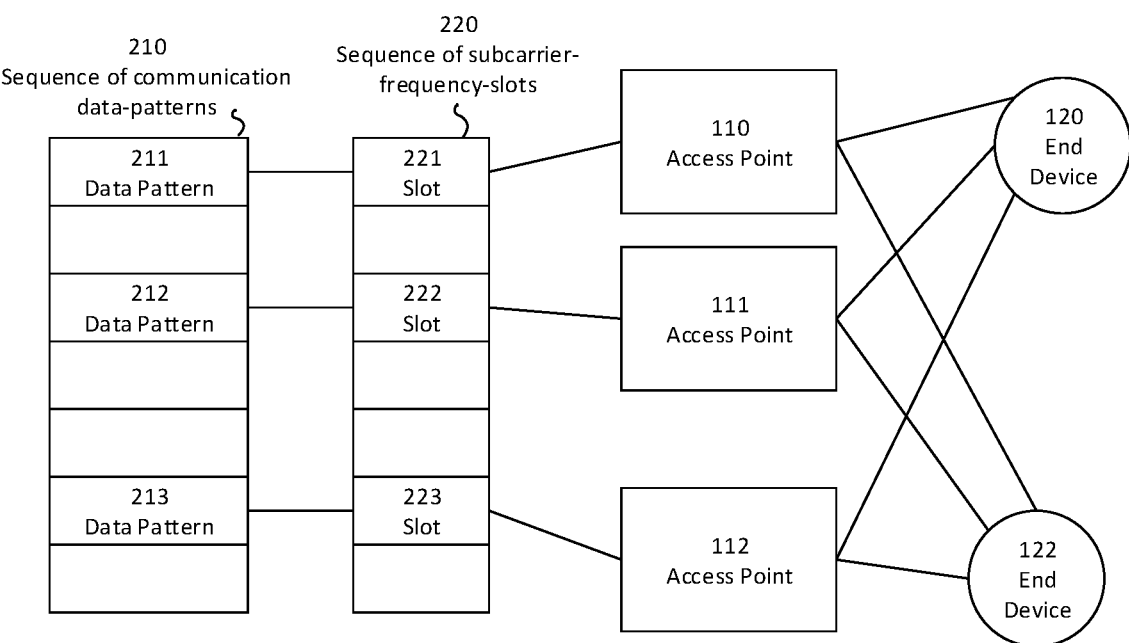
FIG. 2 is a schematic block diagram illustrating an exemplary association between an alignment subcarrier-frequency-slot and a communication data-pattern, according to some embodiments.

In some embodiments, configuring apparatus 100 comprises executing a beam alignment protocol based on a sequence of communication data patterns where each is associated with one of a sequence of alignment subcarrier-frequency-slots, Reference is now made also to FIG. 2, showing a schematic block diagram illustrating an exemplary association 200 between an alignment subcarrier-frequency-slot and a communication data-pattern, according to some embodiments. In such embodiments, sequence 220 of subcarrier-frequency-slots is used for the plurality of access point to transmit a sequence of beam-alignment signals. Optionally, for example when the plurality of access points is connected to the plurality of end devices using a wireless network protocol having a plurality of beacon slots, sequence 220 of subcarrier-frequency-slots is a sequence of beacon slots of the plurality of beacon slots. Optionally, sequence 210 of communication data-patterns comprises communication data-pattern 211, communication data-pattern 212, and communication data-pattern 213. Optionally, each communication data-pattern of sequence 210 of communication data-patterns comprises a sequence of data channel frequencies. Optionally, each of the sequence of data channel frequencies is associated with a transmission direction. Optionally, sequence 210 of communication data-patterns is selected from an identified plurality of communication data-patterns.

Optionally, each of sequence 210 of communication data-patterns is associated with one of sequence 220 of subcarrier-frequency-slots. For example, in exemplary association 200 communication data-pattern 211 is associated with subcarrier-frequency-slot 221, data-pattern 212 is associated with subcarrier-frequency-slot 222, and data-pattern 213 is associated with subcarrier-frequency-slot 223. Optionally, each of the plurality of access points is associated with one of sequence 220 or subcarrier-frequency-slots. For example, access point no may be associated with subcarrier-frequency-slot 221, access point 111 may be associated with subcarrier-frequency-slot 222 and access point 112 may be associated with subcarrier-frequency-slot 223. In this example, during subcarrier-frequency-slot 221 access point 110 optionally sends one of the sequence of beam-alignment signals according to communication data-pattern 211. Optionally, one or more of the plurality of end devices, for example end device 120 and end device 122, receive the beam-alignment signal during subcarrier-frequency-slot 221. Thus, a receive information record computed by an end device for the beam-alignment signal received during subcarrier-frequency-slot 221 is associated with communication data-pattern 211 and access point 110.

Similarly, in this example, during subcarrier-frequency-slot 222 access point 111 optionally sends one other of the sequence of beam-alignment signals according to communication data-pattern 212, which may be received by the one or more of the plurality of end devices during subcarrier-frequency-slot 222. Thus, another receive information record computed by an end device for the other beam-alignment signal received during subcarrier-frequency-slot 222 is associated with communication data-pattern 212 and access point 111.

Further in this example, during subcarrier-frequency-slot 223 access point 112 optionally sends one yet other of the sequence of beam-alignment signals according to communication data-pattern 213, which may be received by the one or more of the plurality of end devices during subcarrier-frequency-slot 223. Thus, yet another receive information record computed by an end device for the yet other beam-alignment signal received during subcarrier-frequency-slot 223 is associated with communication data-pattern 213 and access point 112.

To support wireless communication, in some embodiments apparatus 100 implements the following optional method.

Figure 3:
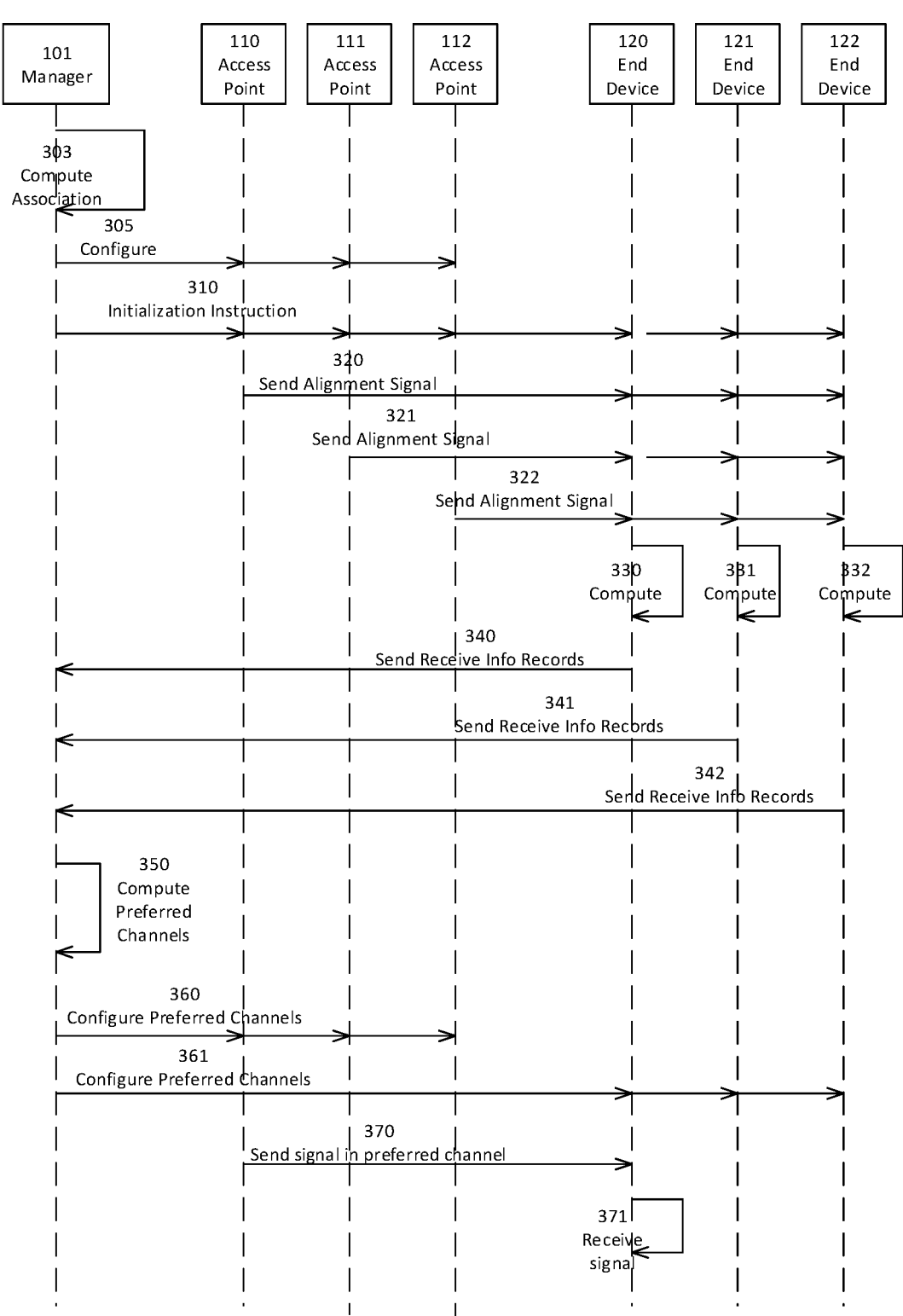
FIG. 3 is a sequence diagram of an optional flow of operations, according to some embodiments.

Reference is now made also to FIG. 3, showing a sequence diagram of an optional flow of operations 300, according to some embodiments. In such embodiments, manager 101 configures in 305 each of the plurality of access points to transmit one of the sequence of beam-alignment signals, including for example configuring access point 110, access point in and access point 112. Optionally, manager 101 configures each of the plurality of access points to transmit the beam-alignment signal in the respective alignment subcarrier-frequency-slot associated with the respective communication data-pattern associated with the beam-alignment signal. In this example, in 305, manager 101 configures access point no to transmit a beam-alignment signal in alignment subcarrier-frequency-slot 221, optionally according to communication data-pattern 211. Further in this example, manager 101 configures access point 111 to transmit another beam-alignment signal in alignment subcarrier-frequency-slot 222, optionally according to communication data-pattern 212. Furthermore, in this example, in 305, manager 101 configures access point 113 to transmit yet another beam-alignment signal in alignment subcarrier-frequency-slot 223, optionally according to communication data-pattern 213. Optionally, manager 101 sends each of the plurality of access point sequence 210 of communication data-patterns and additionally, or alternatively, sequence 220 of subcarrier-frequency-slots. Optionally, manager 101 sends each of the plurality of access points a subcarrier-frequency-slot indicator, indicative of an alignment subcarrier-frequency-slot of sequence 220 of subcarrier-frequency-slots associated with the access point.

Optionally, manager 101 configures at least some of the plurality of access points to transmit the beam-alignment signal using the other wireless control channel frequency. Optionally, manager 101 configures at least some other of the plurality of access points to transmit the beam-alignment signal using the wired digital communication network.

In 310, manager 101 optionally sends a protocol initialization instruction to the plurality of access points and the plurality of end devices, including to end device 120, end device 121, and end device 122. Optionally, manager 101 sends the protocol initialization instruction to the plurality of end devices using the wireless control channel frequency. Optionally, manager 101 sends the protocol initialization instruction to the plurality of access points using the other wireless control channel frequency.

In 310, manager 101 optionally sends a protocol initialization instruction to the plurality of access points and the plurality of end devices, including to end device 120, end device 121, and end device 122. Optionally, manager 101 sends the protocol initialization instruction to the plurality of end devices using the wireless control channel frequency. Optionally, manager 101 sends the protocol initialization instruction to the plurality of access points using the other wireless control channel frequency.

Similarly, in 321 access point 111 optionally sends in alignment subcarrier-frequency-slot 222 another beam-alignment signal, optionally according to communication data-pattern 212. Optionally, alignment subcarrier-frequency-slot 222 is selected from sequence 220 of subcarrier-frequency-slots according to the respective subcarrier-frequency-slot indicator sent by manager 101 to access point 111. Similarly, in 322 access point 112 optionally sends in alignment subcarrier-frequency-slot 223 yet another beam-alignment signal, optionally according to communication data-pattern 213. Optionally, alignment subcarrier-frequency-slot 223 is selected from sequence 220 of subcarrier-frequency-slots according to the respective subcarrier-frequency-slot indicator sent by manager 101 to access point 112.

Optionally, during subcarrier-frequency-slot 221 at least some of the plurality of end devices receive the beam-alignment signal sent by access point no. Optionally, one or more of the plurality of end devices, for example end device 120, receive the beam-alignment signal using a plurality of data channel frequencies, for example according to the respective sequence of data channel frequencies of communication data-pattern 211. Optionally, at least one of the plurality of data channel frequencies is a mmWave frequency.

Optionally, during subcarrier-frequency-slot 222 at least some of the plurality of end devices receive the other beam-alignment signal sent by access point in, and during subcarrier-frequency-slot 223 at least some of the plurality of end devices receive the yet other beam-alignment signal sent by access point 112.

In 330, end device 120 optionally computes a plurality of receive information records. Optionally, each of the plurality of receive information records is computed for one of the sequence of beam-alignment signals and is indicative of a quality of a best part of the respective beam-alignment signal as received by end device 120. Optionally, a part of the respective beam-alignment signal is received in one of the sequence of data channel frequencies of the respective communication data-pattern associated with the respective subcarrier-frequency-slot in which the respective beam-alignment signal was received. Optionally, each of the plurality of receive information records comprises a device identification value of end device 120. Optionally, each of the plurality of receive information records comprises for each of the sequence of communication data-patterns a plurality of signal quality values. Optionally, each of the plurality of signal quality values is indicative of the best part of the respective beam alignment signal. Some examples of a signal quality value are: an angle of arrival, an estimated angle of departure, and a signal strength indicator.

In 340, end device 120 optionally sends the plurality of receive information records to manager 101. Optionally, end device 120 computes one receive information record indicative of a plurality of signal qualities of the sequence of beam-alignment signals and sends the one receive information record to manager 101.

Similarly, in 331, end device 121 optionally computes another plurality of receive information records. Optionally each of the other plurality of receive information records is computed for one of the sequence of beam-alignment signals and is indicative of another quality of another best part of the respective beam-alignment signal as received by end device 121. Optionally, in 341 end device 121 sends the other plurality of receive information records to manager 101. Similarly, in 332, end device 122 optionally computes yet another plurality of receive information records. Optionally each of the yet other plurality of receive information records is computed for one of the sequence of beam-alignment signals and is indicative of yet another quality of yet another best part of the respective beam-alignment signal as received by end device 122. Optionally, in 342 end device 122 sends the yet other plurality of receive information records to manager 101.

In 350, manager 101 optionally receives a combined plurality of receive information records comprising the plurality of receive information records sent by end device 120, the other plurality of receive information records sent by end device 121 and the yet other plurality of receive information records sent by end device 122. Optionally, the combined plurality of receive information records comprises one or more receive information records received from one or more of the plurality of access points where each is indicative of a plurality of signal qualities of the sequence of beam-alignment signals. Optionally, receiving the combined plurality of receive information records comprises using the wireless control channel frequency.

Further in 350, manager 101 optionally computes a plurality of preferred communication channels according to the combined plurality of receive information records. Optionally, each of the plurality of preferred communication channels is for one of the plurality of wireless access points, optionally associated with one or more of the plurality of end devices, optionally for communicating therewith. Optionally, manager 101 computes the plurality of preferred communication channels such that the plurality of preferred communication channels minimizes an amount of interference between the plurality of preferred communication channels according to at least one communication metric. An example of a communication metric is an attenuation in receive signal strength.

In 360, manager 101 optionally configures the plurality of access points according to the plurality of preferred communication channels, optionally using the other wireless control channel frequency. Optionally, manager 101 sends each of the plurality of access points, for example access point 110, at least some of the preferred communication channels, where each is associated with one or more of the plurality of end device, for example with end device 120.

Optionally, in 361, manager 101 configures the plurality of end device according to the plurality of preferred communication channels, optionally using the wireless control channel frequency. Optionally, manager 101 sends each end device, for example end device 120, one or more channel configurations for communicating with one or more of the plurality of access points, for example a channel configuration for communicating with access point 110.

For wireless communication, in 370 access point 110 optionally sends end device 120 one or more signals according to the preferred communication channel computed for access point no and associated with end device 120. Optionally, in 371, end device 120 receives the one or more signals according to the channel configuration for communicating with access point 110.

In some embodiments, to configure the plurality of access points to perform a beam-alignment protocol, in 303, manager 101 computes an association between each of the plurality of wireless access points and one of sequence 210 of communication data-patterns. Optionally, manager 101 uses the association computed in 303 when configuring each of the plurality of access points in 305. Optionally, associating each of the plurality of wireless access points with one of sequence 210 of communication data-patterns minimizes an amount of signal interference between a plurality of wireless signals transmitted simultaneously by the plurality of wireless access points, according to one or more signal quality metrics, for example according to a mean average interference between all pairs of an access point of the plurality of access points and an end device of the plurality of end devices.

Optionally, associating each of the plurality of wireless access points with one of sequence 210 of communication data-patterns comprises associating a communication data-pattern with one or more access points.

Reference is now made also to FIG. 4, showing a flowchart schematically representing an optional flow of operations 400 for associating an access point with a communication data-pattern, according to some embodiments.

In such embodiments, for at least one of the identified plurality of communication data-patterns, in 410, manager 101 selects a set of wireless access points from the plurality of wireless access points. Optionally, manager 101 selects the set of wireless access points such that for each two of the set of wireless access points a distance between the two access points is greater than a minimum distance threshold. Optionally, the minimum distance threshold reduces an amount of interference between two signals sent simultaneously by the two access points.

In 420, manager 101 optionally associates each of the set of wireless access points with the at least one of the plurality of communication data-patterns. Optionally, manager 101 adds the at least one of the plurality of communication data-patterns to sequence 210 of communication data-patterns. Optionally, manager 101 repeats 410 and 420 for communication data-pattern of sequence 210 of communication data-patterns.

Optionally, associating each of the plurality of wireless access points with one of sequence 210 of communication data-patterns comprises clustering the plurality of access points.

Figure 5:
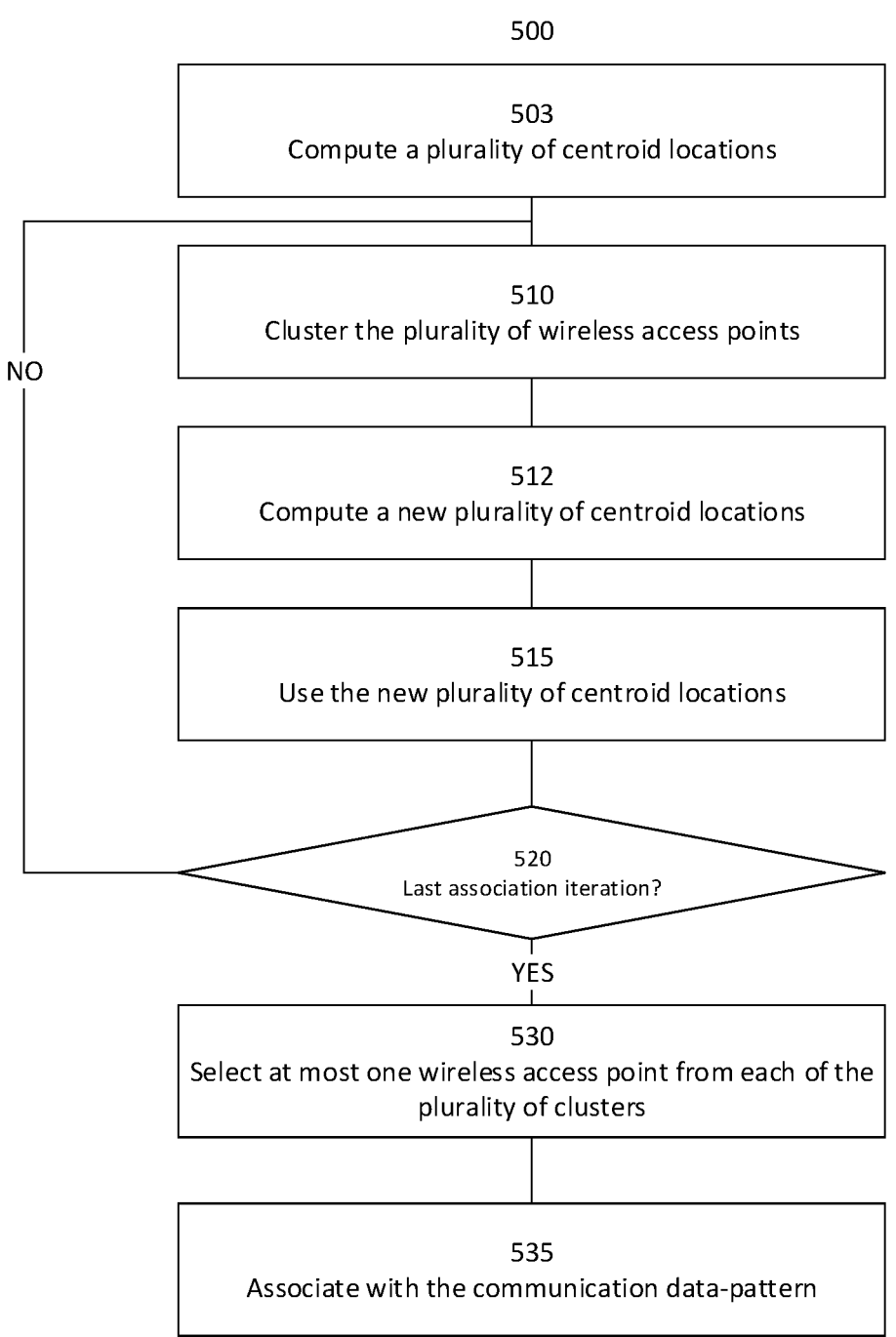
FIG. 5 is a flowchart schematically representing another optional flow of operations for associating an access point with a communication data-pattern, according to some embodiments.

Reference is now made also to FIG. 5, showing a flowchart schematically representing another optional flow of operations 500 for associating an access point with a communication data-pattern, according to some embodiments.

In such embodiments, associating each of the plurality of wireless access points with one of the sequence of communication data-patterns comprises manager 101 executing a plurality of association iterations. In each of the plurality of association iterations, in 503, manager 101 optionally computes a plurality of centroid locations in space 150. Optionally, in 510, manager 101 produces a plurality of clusters by clustering the plurality of wireless access points according to a respective distance from one of the plurality of centroid locations. Optionally, each of the plurality of clusters has a plurality of cluster access points. Optionally, in 512, manager 101 computes a new plurality of centroid locations. Optionally, manager 101 computes the new plurality of centroid locations by computing for each of the plurality of clusters a new centroid location. Optionally, each new centroid location computed for one of the plurality of clusters has a common mean distance from each of the respective plurality of cluster access points of the cluster. In 515, manager 101 optionally uses the new plurality of centroid locations in a consecutive association iteration of the plurality of association iterations.

After determining in 520 that an association iteration is a last association iteration, manager 101 optionally repeats 530 and 535 for each of the sequence of communication data-patterns. For a communication data-pattern of the sequence of communication data-patterns, in 530, manager 101 optionally selects from each cluster of the plurality of clusters of the last association iteration at most one wireless access point from the cluster's respective plurality of cluster access points, and in 535, manager 101 optionally associates the at most one wireless access point with the communication data-pattern. Optionally, associating the at most one wireless access point with the communication data-pattern is according to an assignment pattern, for example to reduce the likelihood that two wireless access points associated with a common communication data-pattern interfere with each other. For example, an assignment pattern may be to assign according to latitude, such that a first communication data-pattern of the sequence may be associated with a northern-most wireless access point of each respective plurality of cluster access points of each of the plurality of clusters, a consecutive communication data-pattern in the sequence may be associated with a next-norther wireless access point etc. Optionally, associating sequence 220 of subcarrier-frequency-slots with sequence 210 of communication data-patterns is in sequence according to a cluster. Optionally, for one cluster a slot of sequence 220 of subcarrier-frequency-slots is associated with a first data-pattern of sequence 210 of communication data-patterns and for another cluster the slot of sequence 220 of subcarrier-frequency-slots is associated with a second data-pattern of sequence 210 of communication data-patterns. As a result, during the slot, a first access point of the one cluster transmits using the first data-pattern and a second access point of the other cluster transmits using the second data-pattern, reducing interference.

In some embodiments, access point no implements the following optional method.

Figure 6A:
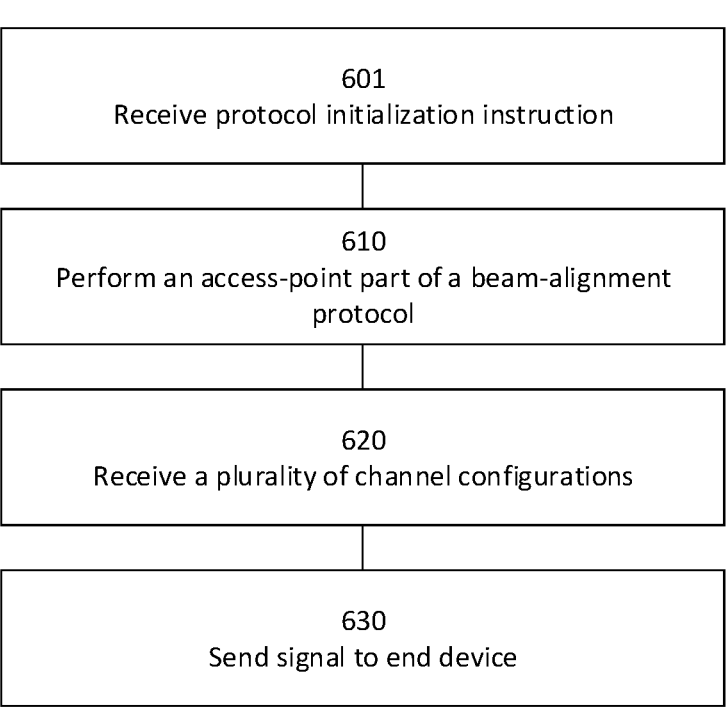
FIGS. 6A and 6B are flowcharts schematically representing an optional flow of operations for a wireless access point, according to some embodiments.

Reference is now made also to FIG. 6A, showing a flowchart schematically representing an optional flow of operations 600A for a wireless access point, according to some embodiments. In such embodiments, in 601 access point processing unit 130 receives from manager 101 a protocol initialization instruction, for example sent by manager 101 in 310. In 610, access point processing unit 130 optionally performs an access-point part of a beam-alignment protocol based on a sequence of communication data-patterns, where each of the sequence of communication data patterns is associated with one of a sequence of alignment subcarrier-frequency-slots, for example an access-point part of method 300. Optionally, access point processing unit 130 performs the access-point part of the beam-alignment protocol in response to the protocol initialization instruction.

Figure 6B:
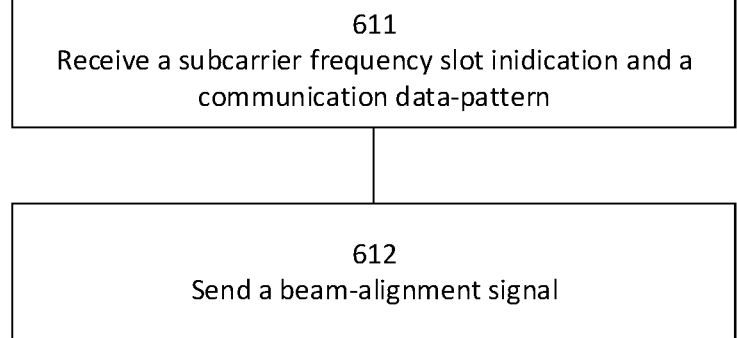

Reference is now made also to FIG. 6B, showing a flowchart schematically representing an additional optional flow of operations 600B for an access-point part of a beam-alignment protocol, according to some embodiments. Optionally, in 611, access point processing unit 130 receives from manager 101 a subcarrier-frequency-slot indicator and a communication data-pattern for performing beam-alignment. Optionally, the subcarrier-frequency-slot indicator is indicative of one of sequence 220 of subcarrier-frequency-slots. Optionally, access point processing unit 130 receives from manager 101 sequence 220 of subcarrier-frequency-slots. Optionally, access point processing unit 130 receives from manager 101 sequence 210 of communication data-patterns. In 612, access point processing unit 130 optionally sends a beam-alignment signal according to the communication data-pattern, in response to the protocol initialization instruction received in 601. Optionally, access point processing unit 130 sends the beam-alignment signal using constant power levels. Optionally, access point processing unit 130 sends the beam-alignment signal in an alignment subcarrier-frequency-slot. Optionally the alignment subcarrier-frequency-slot is selected from sequence 220 of subcarrier-frequency-slots, optionally according to the subcarrier-frequency-slot indicator.

Optionally, sending the beam alignment signal according to the communication data-pattern comprises executing a plurality of data-pattern iterations. Optionally, in each of the plurality of data-pattern iterations, access point processing unit 130 transmits part of the beam alignment signal using one of a sequence of data channel frequencies of the communication data-pattern, in the transmission direction associated with the data channel frequency. Optionally, the plurality of data-pattern iterations are executed consecutively in order of the sequence of data channel frequencies. Optionally, the beam-alignment signal comprises a plurality of symbols modulated using orthogonal frequency-division multiplexing (OFDM) symbols. For example, a part of the beam-alignment signal may have 14 OFDM symbols. Optionally, each part of communication data-pattern has a common amount of OFDM symbols when transmitting the beam-alignment.

Reference is now made again to FIG. 6A. In 620, access point processing unit 130 receives from manager 101 a plurality of channel configurations, each associated with one of the plurality of end devices. Optionally, the plurality of channel configurations comprises at least some of the plurality of preferred channel configurations manager 101 computed in 350. In 630, access point processing unit 130 optionally sends to one or more of the plurality of end devices one or more signals according to the respective channel configurations associated with the one or more end devices.

In some embodiments, end device 122 implements the following optional method.

Figure 7A:
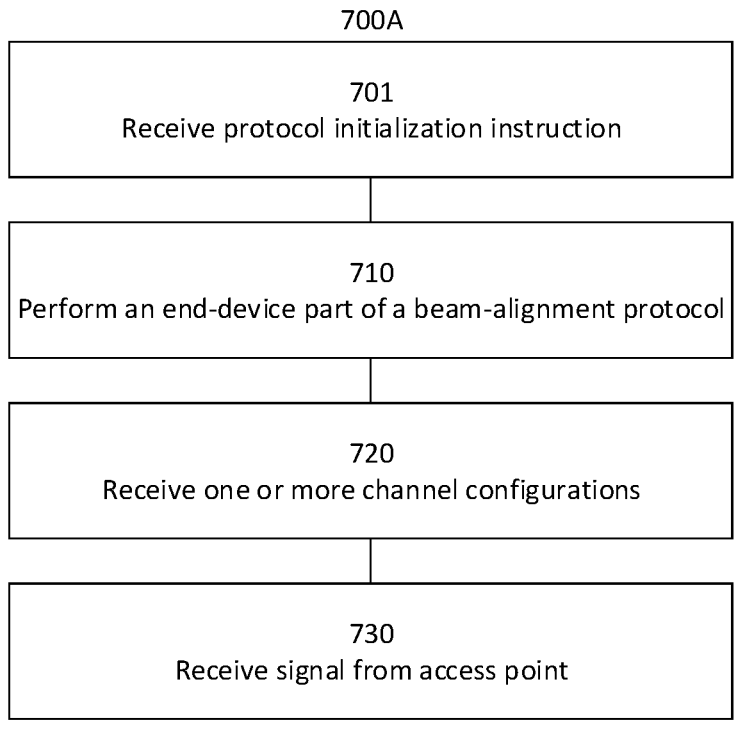
FIGS. 7A and 7B are flowcharts schematically representing an optional flow of operations for a wireless end device, according to some embodiments.

Reference is now made also to FIG. 7A, showing a flowchart schematically representing an optional flow of operations 700A for a wireless end device, according to some embodiments. In such embodiments, in 701 device processing unit 132 receives from manager 101 a protocol initialization instruction, for example sent by manager 101 in 310. In 710, device processing unit 132 optionally performs a wireless-end-device part of a beam-alignment protocol based on a sequence of communication data-patterns, where each of the sequence of communication data patterns is associated with one of a sequence of alignment subcarrier-frequency-slots, for example a wireless-end-device part of method 300. Optionally, device processing unit 132 performs the wireless-end-device part of the beam-alignment protocol in response to the protocol initialization instruction.

Figure 7B:
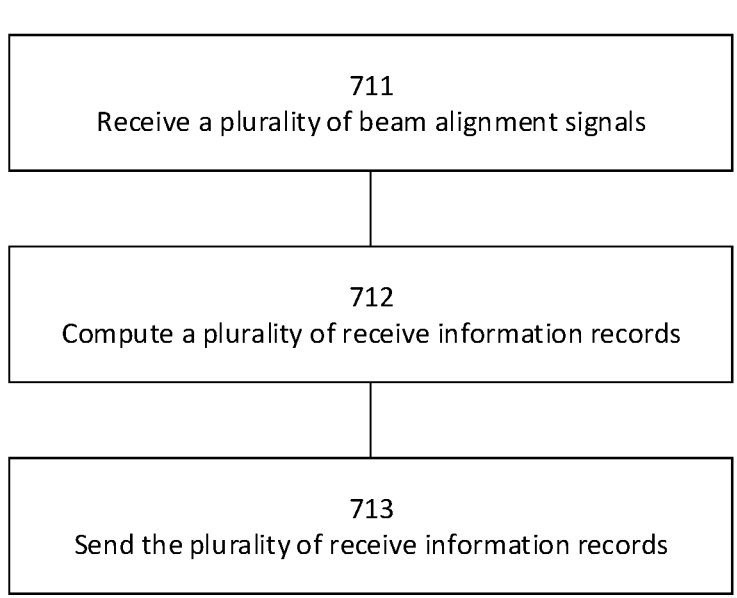

Reference is now made also to FIG. 7B, showing a flowchart schematically representing an additional optional flow of operations 700B for a wireless-end-device part of a beam-alignment protocol, according to some embodiments. In 711, device processing unit 132 receives a plurality of beam-alignment signals. Optionally, device processing unit 132 receives the plurality of beam-alignment signals from at least some of the plurality of access points. Optionally, device processing unit 132 receives each of the plurality of beam-alignment signals is one of sequence 220 of subcarrier-frequency-slots. Optionally, each alignment subcarrier-frequency-slot of sequence 220 of subcarrier-frequency-slots is associated with one of sequence 210 of communication data-patterns.

In 712, device processing unit 132 optionally computes a plurality of receive information records. Optionally, each of the plurality of receive information records is computed from one of the plurality of beam-alignment signals and is optionally indicative of a quality of a best part of the respective beam-alignment signal for which the record was computed. Optionally, each of the plurality of receive information records is associated with the respective alignment subcarrier-frequency-slot in which the respective beam-alignment signal was received.

In 713, device processing unit 132 optionally sends the plurality of receive information records to manager 101.

Reference is now made again to FIG. 7A. In 712, device processing unit 132 optionally receives from the manager one or more channel configurations for communicating with one or more access points. Optionally, the one or more channel configurations are according to the plurality of preferred communication channels computed by the manager in 350. Optionally, in 713 device processing unit 132 receives from the one or more access points one or more signals, send according to the one or more channel configurations.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant wireless access points, wireless end devices, and communication data-patterns will be developed and the scope of the terms "wireless access point", "wireless end device", and "communication data-pattern" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present disclosure. To the extent that section headings are used, they should not be construed as necessarily limiting. In addition, any priority document(s) of this application is/are hereby incorporated herein by reference in its/their entirety.

What is claimed is:

1. An apparatus, comprising:

at least one processor; and at least one non-transitory computer-readable memory connected to the at least one processor and including instructions, wherein the at least one non-transitory computer-readable memory and the instructions are configured, with the at least one processor, to cause the apparatus to:

receive a plurality of information records, wherein the plurality of information records comprises an information record from each of a plurality of wireless end devices and is indicative of a plurality of signal qualities of a sequence of beam-alignment signals, wherein each beam-alignment signal of the sequence of beam-alignment signals is associated with a communication data-pattern of a sequence of communication data-patterns, and wherein each beam-alignment signal received by a respective wireless end device of the plurality of wireless end devices is in an alignment subcarrier-frequency-slot associated with the respective communication data-pattern associated with the beam-alignment signal;

compute a plurality of communication channels according to the plurality of information records, each communication channel of the plurality of communication channels for a wireless access point of a plurality of wireless access points; and configure the plurality of wireless access points according to the plurality of communication channels.

2. The apparatus according to claim 1, wherein the instructions further cause the at least one processor to:

configure each wireless access point of the plurality of wireless access points to transmit a beam-alignment signal of the sequence of beam-alignment signals in the alignment subcarrier-frequency-slot associated with the respective communication data-pattern associated with the beam-alignment signal; and send a protocol initialization instruction to the plurality of wireless access points and the plurality of wireless end devices.

3. The apparatus according to claim 2, wherein the beam-alignment signal is received by the respective wireless end device using a plurality of data channel frequencies, wherein the plurality of information records is received using a wireless control channel frequency, and wherein the protocol initialization instruction is sent to the plurality of wireless end devices using the wireless control channel frequency.

4. The apparatus according to claim 3, wherein at least one data channel frequency of the plurality of data channel frequencies comprises a millimeter wave frequency.

5. The apparatus according to claim 3, wherein the wireless control channel frequency comprises a frequency other than a millimeter wave frequency.

6. The apparatus according to claim 1, wherein each communication data-pattern of the sequence of communication data-patterns comprises a sequence of data channel frequencies, and each data channel frequency is associated with a transmission direction.

7. A method, comprising:

receiving a plurality of information records, wherein the plurality of information records comprises an information record from each of a plurality of wireless end devices and is indicative of a plurality of signal qualities of a sequence of beam-alignment signals, wherein each beam-alignment signal of the sequence of beam-alignment signals is associated with a communication data-pattern of a sequence of communication data-patterns, wherein each beam-alignment signal received by a respective wireless end device of the plurality of wireless end devices is in an alignment subcarrier-frequency-slot associated with the respective communication data-pattern associated with the beam-alignment signal;

computing a plurality of communication channels according to the plurality of information records, each communication channel of the plurality of communication channels for a wireless access point of a plurality of wireless access points; and configuring the plurality of wireless access points according to the plurality of communication channels.

8. The method according to claim 7, further comprising:

configuring each of the plurality of wireless access points to transmit a beam-alignment signal of the sequence of beam-alignment signals in the alignment subcarrier-frequency-slot associated with the respective communication data-pattern associated with the beam-alignment signal; and sending a protocol initialization instruction to the plurality of wireless access points and the plurality of wireless end devices.

9. The method according to claim 8, wherein the beam-alignment signal is received by the respective wireless end device using a plurality of data channel frequencies, wherein the plurality of information records is received using a wireless control channel frequency, and wherein the protocol initialization instruction is sent to the plurality of wireless end devices using the wireless control channel frequency.

10. The method according to claim 9, wherein at least one data channel frequency of the plurality of data channel frequencies comprises a millimeter wave frequency.

11. The method according to claim 9, wherein the wireless control channel frequency comprises a frequency other than a millimeter wave frequency.

12. The method according to claim 7, wherein each communication data-pattern of the sequence of communication data-patterns comprises a sequence of data channel frequencies, and each data channel frequency is associated with a transmission direction.

13. A non-transitory computer-readable storage medium storing computer instructions that, when executed by at least one processor, cause the at least one processor to perform at least:

receiving a plurality of information records, wherein the plurality of information records comprises an information record from each of a plurality of wireless end devices and is indicative of a plurality of signal qualities of a sequence of beam-alignment signals, wherein each beam-alignment signal of the sequence of beam-alignment signals is associated with a communication data-pattern of a sequence of communication data-patterns, and wherein each beam-alignment signal received by a respective wireless end device of the plurality of wireless end devices is in an alignment subcarrier-frequency-slot associated with the respective communication data-pattern associated with the beam-alignment signal;

computing a plurality of communication channels according to the plurality of information records, each communication channel of the plurality of communication channels for a wireless access point of a plurality of wireless access points; and configuring the plurality of wireless access points according to the plurality of communication channels.

14. The non-transitory computer-readable storage medium according to claim 13, wherein the computer instructions further cause the at least one processor to perform:

configuring each of the plurality of wireless access points to transmit a beam-alignment signal of the sequence of beam-alignment signals in the alignment subcarrier-frequency-slot associated with the respective communication data-pattern associated with the beam-alignment signal; and sending a protocol initialization instruction to the plurality of wireless access points and the plurality of wireless end devices.

15. The non-transitory computer-readable storage medium according to claim 14, wherein the beam-alignment signal is received by the respective wireless end device using a plurality of data channel frequencies, wherein the plurality of information records is received using a wireless control channel frequency, and wherein the protocol initialization instruction is sent to the plurality of wireless end devices comprises using the wireless control channel frequency.

16. The non-transitory computer-readable storage medium according to claim 15, wherein at least one data channel frequency of the plurality of data channel frequencies comprises a millimeter wave frequency.

17. The non-transitory computer-readable storage medium according to claim 15, wherein the wireless control channel frequency comprises a frequency other than a millimeter wave frequency.

18. The non-transitory computer-readable storage medium according to claim 13, wherein each communication data-pattern of the sequence of communication data-patterns comprises a sequence of data channel frequencies, and each data channel frequency is associated with a transmission direction.

* * * * *